Patented June 1, 1937

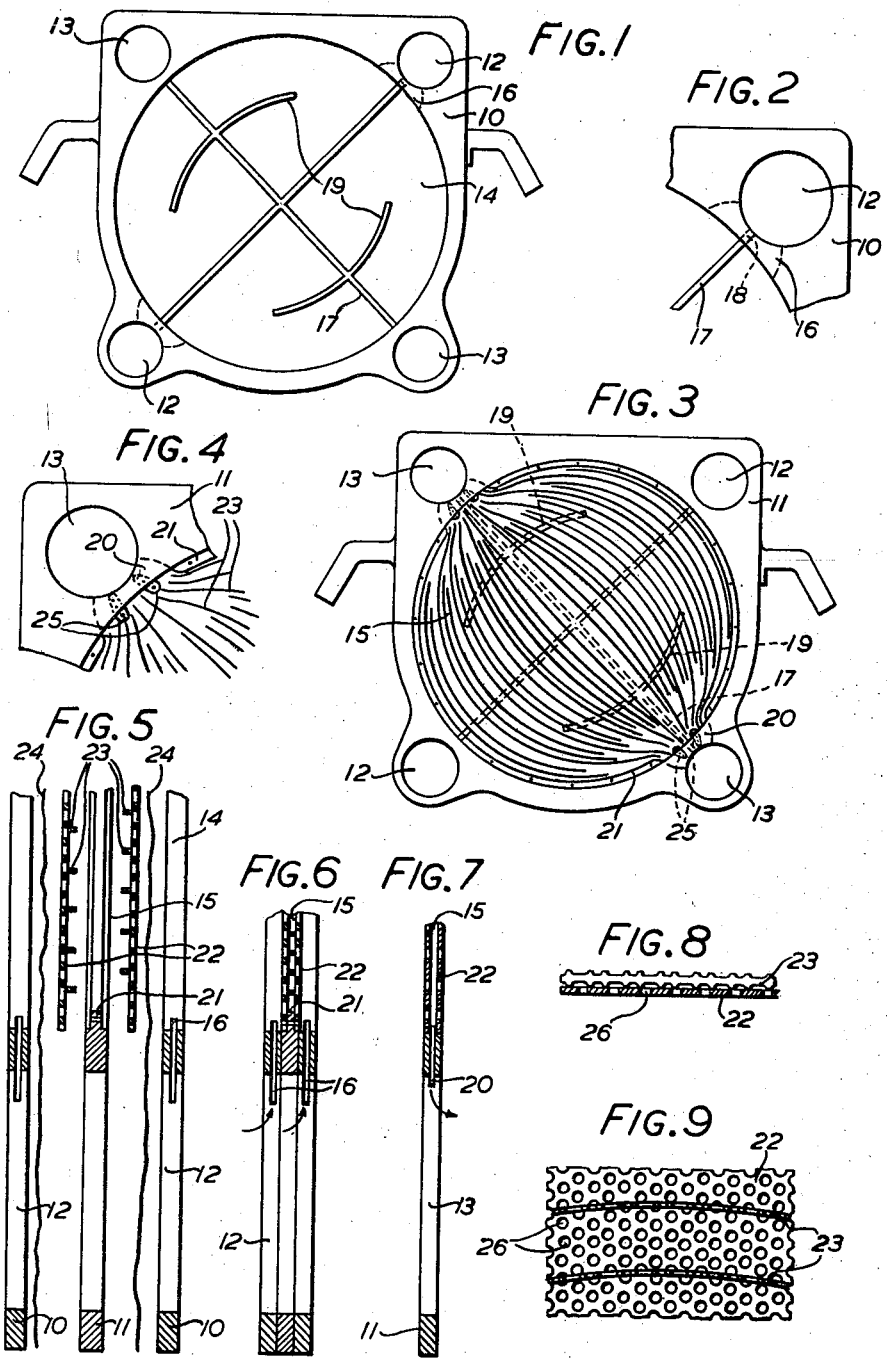

2,082,452

UNITED STATES PATENT OFFICE 2,082,452

FILTERING APPARATUS

Edward Kinsella and Charles Wesley Addy, Spondon, near Derby, England, assignors to Celanese Corporation of America, a corporation of Delaware Application August 20, 1935, Serial No. 36,951
In Great Britain September 1, 1934

9 Claims. (Cl. 210—195)

This invention relates to filtering apparatus, and in particular to filter presses of the type comprising a plurality of frames and plates adapted to be assembled face to face in alternation and adapted to receive a sheet of filter medium between each pair of adjacent faces, means to admit liquid to be filtered to the frames, and means to withdraw filtered liquid from the plates, each of said frames being formed with a central cavity that extends over the filtering area of adjacent plates and serves as a common supply of liquid to be filtered to both adjacent plates, and each of said plates being formed with a central cavity that extends over the filtering areas of the plate and serves as a common receiver of filtered liquid from both adjacent frames.

The object of the present invention is to improve the filtering capacity of filter presses of this type, to simplify construction of the plates and frames, and generally to effect a greater efficiency in the operation of the apparatus. Two of the principal features of the invention consist in an improvement of the filter surface provided by each plate, and the simplification of the construction of each frame.

The filter plate according to the invention has a central area in which are located two perforated plates spaced apart to leave between them a space in free communication with outlet passages for the filtered liquid. The spacing means are preferably in the form of strips disposed so as to form passages to lead liquid from any part of the space between the plates smoothly towards the outlets. The outer surfaces of the two perforated plates are preferably sunk slightly below the surfaces of the frame in which the plates are mounted.

The frame according to the invention has a central cavity corresponding in size and shape to the area of the filter plate in which the perforated plates are disposed, this cavity communicating with inlet openings and permitting the free passage of the liquid to be filtered over the whole area of the perforated plates. The cavity in the frame may be provided with means to support the perforated area of an adjacent filter plate in the event of any blockage resulting in out-of-balance pressure such as might damage the filter plate. These supporting means are so disposed as not to interfere with the free flow of the incoming liquid over the whole area of the cavity.

Both the frames and the plates present the important advantage that substantially the whole of their central areas is available for the free flow of the liquid both before and after its passage through the filter cloth disposed between the contacting surfaces. Consequently, both plates and frames may be relatively thin, with the result that a much larger number of plates and frames can be accommodated than with the usual construction in which the central areas are filled with a web and in which passage of the liquid is through recessed portions of the plates and frames on the two sides of the webs. Further, the new construction of plate and frame permits these members to be made of much stronger metal than the usual cast-iron, with the result that in order to withstand the high working pressure to which filter presses of this kind are usually subjected, reliance has not to be placed upon the provision of webs in the central areas as above mentioned. By permitting the adoption of stronger material, such as for example galvanized steel, the thickness of plates and frames to withstand any given pressure can be reduced to a minimum, which also results in a larger number of plates and frames being accommodated in any particular length of press.

The plates and frames according to the invention will now be described in greater detail, the following construction being one that is particularly suitable for execution in steel.

Fig. 1 is a face view of a frame;
Fig. 2 is an enlarged detail of Fig. 1;
Fig. 3 is a face view of a plate;
Fig. 4 is an enlarged detail of Fig. 3;
Fig. 5 shows in section the parts of a plate ready for assembly and also adjacent frames and sheets of filter cloth;
Fig. 6 shows the parts of Fig. 5 after assembly;
Fig. 7 is an enlarged section through the corner of the plate shown in Fig. 4; and
Figs. 8 and 9 show in part sectional elevation and plan respectively a detail of the plates.

As is shown in Figs. 1 and 3, both frames 10 and plates 11 are of substantially the same thickness, each being roughly square externally with circular holes cut in the corners to provide pairs of inlet passages 12 and outlet passages 13 running through the length of the whole series of frames and plates when assembled. Circular cavities 14, 15 occupy substantially the whole area of the frames and plates respectively within the space remaining inside the four inlet and outlet openings.

In the two diametrically opposed corners of each frame occupied by the inlet openings 12 shallow but wide passages 16 are cut (e. g. milled) in the thickness of the metal to effect a communication between the cavity 14 and the openings 12 to permit the free entry of the liquid to be filtered (see the arrows in Fig. 6). A cruciform member 17 of substantially the same thickness as the sheet of metal constituting the frame has the ends of its two arms secured to the frame near each of the corner openings, as by welding or by screws at 18. Such member may, in addition, bear a pair of curved arms 19 extending from one of its diagonal members towards the inlet openings.

Shallow but wide openings 20 formed in the thickness of the metal connect the central cavity 15 of each filter plate to the pair of outlet openings 13 (see the arrow in Fig. 7), the openings thus connected in the filter plates 11 being diametrically opposed to the inlet openings 12 connected to the central cavities in the frames 10.

The periphery of the circular area in each plate is recessed on each side to form an annular shoulder 21 to receive a pair of circular perforated plates 22. Preferably, the recesses are slightly deeper than the thickness of the plates 22, so that the plates lie slightly below the surface of the plate 11. On the inner side of each perforated plate 22 is mounted a series of metal strips 23 standing edgewise from the plate. The strips 23 are of such a width that when the two perforated plates 22 are assembled in the central area of the filter plate, the strips secured to one perforated plate contact with the inner surface of the other. The strips 23 extend over the perforated area from corner to corner of the filter plate (see Fig. 3), the strips being evenly spaced from each other along the diagonal joining the two outlet openings 12 and converging from this line towards the inlet openings 13. The strips 23 on one plate 22 alternate with those on the other (see centre of Fig. 5), to form channels leading the filtered liquid to the outlet openings.

In Figs. 3 and 4, the perforated plates 22 are not shown, in order to expose the strips 23. It will be understood, however, that in the assembled filter plate the central area of the plate is completely filled on each side by a perforated plate 22, as indicated by Fig. 7.

Fig. 5 shows how the frames 10 and plates 11 are assembled in alternation, with a sheet 24 of filter cloth interposed between adjacent frames and plates. The assembly (which may number some dozens of frames and plates) is clamped tight, as shown in Fig. 6.

The liquid to be filtered enters the cavity 14 of each frame 10 by the inlet openings 12 and is distributed over the area of the cavity, and, therefore, of the two sheets of filter cloth. Support for the sheets 24 is provided by the perforated plates 22. The liquid passes through the sheets 24 and plates 22 into the cavity 15 of each plate 11, the strips 23 subdividing the flow of liquid and providing substantially uniform rate of flow through each unit area of plate.

The smooth flow of the liquid continues through the passages 20 into the outlets 13. Flow dividing plates 25 may be inserted in the passages 20 to provide additional points of support for the plates 22 in the gaps in the shoulder 21 formed by the passages 20.

The member 17 in the frames 10 provides a support for the central areas of the plates 11 occupied by the filter cloth and perforated supports (see Fig. 3), this being especially useful in the event of out-of-balance pressure such as might tend to burst the plates. The presence of the member 17 does not interfere with the free flow of the liquid to be filtered over the whole area of the cavity 15, the curvature of the arms 19 tending rather to distribute the flow.

In order that the metal strips 23 do not unduly obscure the perforations 26 in the plates, the edges of the strips are notched as shown in Fig. 8 so that in general contact of the strips and plates is only at the projections between the notches. The strips may be secured in any convenient manner to the plates, e. g. by welding, sweating, or galvanizing. The two perforated plates assembled as described above are secured in the recesses in the filter plate by rivets at the points indicated around the shoulder 20 shown in Fig. 3.

For simplicity of manufacture and assembly, the two halves of each plate 22 have different arrangements of the strips 23, as can be seen from Fig. 3, every other one of the strips forming the final assembly being secured to one half and the remainder to the other half. By these means, only one pattern of plate 22 and assembled strips 23 is required, one pair of such plates providing for the intermeshing of the strips in complementary halves, as in Fig. 5, to give the desired close spacing of the strips, as in Fig. 6.

The filter plates and frames may be galvanized or otherwise treated to resist rusting or corrosion, or to avoid contamination of the material to be filtered.

The effective area of the frames and plates in the structure described above is substantially the same as that of the usual cast-iron members of the same outside dimensions. Moreover, the freedom from obstruction of the central areas of the plates and frames makes for easy flow of the liquid. The edgewise metal strips provide adequate support for the whole area of the perforated plates and the supporting members in the frames give protection to the perforated plates against bursting.

For a given filtering area, the cost of frames and plates can be much reduced by the construction above described, and by reason of the high efficiency of the frames and plates and their compactness a much increased filtering capacity can be obtained in a press of any particular dimensions. In addition, the new construction enables the frames and plates to be made with a greater filtering area than is usual with cast-iron members, which in turn provides for greater capacity being obtained from a single press.

What we claim and desire to secure by Letters Patent is:—

1. A filter press plate for use in filter presses of the type specified, said plate having a large central hole and a plurality of smaller holes, said holes being adapted to register with corresponding holes in the frames, at least one of the small holes being unconnected with the central hole and serving to convey unfiltered liquid to the inlets of the frames, at least another of the small holes communicating with the central hole and serving as an outlet for the filtrate therefrom, two foraminous discs covering the central hole, said discs being adapted to support the filtering medium, and means for spacing said discs apart, said means comprising a plurality of metal strips on edge, each strip having one edge attached to one of said discs and the other edge bearing on the other disc, and the strips being so disposed in the cavity between the discs as to allow free passage of the filtrate through said cavity to the outlet.

2. A filter press plate for use in filter presses of the type specified, said plate having a large central hole and four smaller holes symmetrically distributed about said central hole, said holes being adapted to register with corresponding holes in the frames, one pair of said smaller holes being unconnected with the central hole and serving to convey unfiltered liquid to the inlets of the frames, the two holes of the other pair communicating with the central hole at opposite points and serving as outlets for the filtrate therefrom, two foraminous discs covering the central hole, said discs being adapted to support the filtering medium, and means for spacing said discs apart, said means comprising a plurality of metal strips on edge, each strip having one edge attached to one of said discs and the other edge bearing on the other disc, and the strips being evenly spaced along the perpendicular bisector of the line joining the two outlets, and converging from said bisector towards said outlets and providing a series of uninterrupted passages for guiding the filtrate that enters said cavity through the discs to the outlets.

3. A filter press plate for use in filter presses of the type specified, said plate being formed from sheet metal and having a large central hole and a plurality of smaller holes, said holes being adapted to register with corresponding holes in the frames, at least one of the small holes being unconnected with the central hole and serving to convey unfiltered liquid to the inlets of the frames, at least another of the small holes communicating by a wide shallow passage in the thickness of the metal with the central hole and serving as an outlet for the filtrate therefrom, two foraminous discs covering the central hole, said discs being adapted to support the filtering medium, and means for spacing said discs apart, said means comprising a plurality of metal strips on edge, each strip having one edge attached to one of said discs and the other edge bearing on the other disc, and the strips being so disposed in the cavity between the discs as to allow free passage of the filtrate through said cavity to the outlet.

4. A filter press plate for use in filter presses of the type specified, said plate being formed from sheet metal and having a large central hole and four smaller holes symmetrically distributed about said hole, said holes being adapted to register with corresponding holes in the frames, one pair of small holes being unconnected with the central hole and serving to convey unfiltered liquid to the inlets of the frames, the two holes of the other pair communicating by means of wide shallow passages in the thickness of the metal with the central hole at opposite points and serving as outlets for the filtrate therefrom, two foraminous discs covering the central hole, said discs being adapted to support the filtering medium, and means for spacing said discs apart, said means comprising a plurality of metal strips on edge, each strip having one edge attached to one of said discs and the other edge bearing on the other disc, and the strips being evenly spaced along the perpendicular bisector of the line joining the two outlets, and converging from said bisector towards said outlets and providing a series of uninterrupted passages for guiding the filtrate that enters said cavity through the discs to the outlets.

5. A filter press comprising a plurality of frame members and plate members and means for clamping said members together with plates and frames alternating, a filtering medium between each two members, each of said members having a large central hole adapted to be covered by said filtering medium and a plurality of smaller holes, at least one communicating with the central hole and at least another unconnected therewith, said communicating holes in one member registering with said unconnected holes in adjacent members to form a plurality of conduits running the length of the assembly, at least one serving to admit unfiltered liquid to the frames and at least another to collect filtrate from the plates, and said central holes registering with one another to allow liquid to pass from each frame through the filtering medium to adjacent plates, two foraminous discs covering the central hole in each plate, said discs being adapted to support the filtering medium and means for spacing said discs apart, said means comprising a plurality of metal strips on edge, each strip having one edge attached to one of said discs and the other edge bearing on the other disc and the strips being so disposed in the cavity between the discs as to allow free passage of the filtrate through said cavity to the outlet.

6. A filter press comprising a plurality of frame members and plate members and means for clamping said members together with plates and frames alternating, a filtering medium between each two members, each of said members having a large central hole adapted to be covered by said filtering medium and a plurality of smaller holes, at least one communicating with the central hole and at least another unconnected therewith, said communicating holes in one member registering with said unconnected holes in adjacent members to form a plurality of conduits running the length of the assembly, at least one serving to admit unfiltered liquid to the frames and at least another to collect filtrate from the plates, and said central holes registering with one another to allow liquid to pass from each frame through the filtering medium to adjacent plates, two foraminous discs covering the central hole in each plate, said discs being adapted to support the filtering medium, means for spacing said discs apart, said means comprising a plurality of metal strips on edge, each strip having one edge attached to one of said discs and the other edge bearing on the other disc and the strips being so disposed in the cavity between the discs as to allow free passage of the filtrate through said cavity to the outlet, and a member disposed in the central cavity of each frame for supporting the discs of adjacent plates in the event of out of balance pressure occurring, the form and position of said member being such as not to prevent the free distribution of the liquid to be filtered over said cavity.

7. A filter press comprising a plurality of frame members and plate members and means for clamping said members together with plates and frames alternating, a filtering medium between each two members, each of said members being formed from sheet metal and having a large central hole adapted to be covered by said filtering medium and a plurality of smaller holes, at least one communicating by a wide shallow passage in the thickness of the metal with the central hole and at least another unconnected therewith, said communicating holes in one member registering with said unconnected holes in adjacent members to form a plurality of conduits running the length of the assembly, at least one serving to admit unfiltered liquid to the frames and at least another to collect filtrate from the plates, and said central holes registering with one another to allow liquid to pass from each frame through the filtering medium to adjacent plates, two foraminous discs covering the central hole in each plate, said discs being adapted to support the filtering medium and means for spacing said discs apart, said means comprising a plurality of metal strips on edge, each strip having one edge attached to one of said discs and the other edge bearing on the other disc and the strips being so disposed in the cavity between the discs as to allow free passage of the filtrate through said cavity to the outlet.

8. A filter press comprising a plurality of frame members and plate members and means for clamping said members together with plates and frames alternating, a filtering medium between each two members, each of said members having a large central hole adapted to be covered by said filtering medium and four smaller holes, two communicating with the central hole at opposite points thereof and the other two unconnected therewith, said communicating holes in one member registering with said unconnected holes in adjacent members to form four conduits running the length of the assembly, two serving to admit unfiltered liquid to the frames and the other two to collect filtrate from the plates, and said central holes registering with one another to allow liquid to pass from each frame through the filtering medium to adjacent plates, two foraminous discs covering the central hole in each plate, said discs being adapted to support the filtering medium and means for spacing said discs apart, said means comprising a plurality of metal strips on edge, each strip having one edge attached to one of said discs and the other edge bearing on the other disc, and the strips being evenly spaced along the perpendicular bisector of the line joining the two outlets, and converging from said bisector towards said outlets and providing a series of uninterrupted passages for guiding the filtrate that enters said cavity through the discs to the outlets, and a member disposed in the central cavity of each frame for supporting the discs of adjacent plates in the event of out of balance pressure occurring, the form and position of said member being such as not to prevent the free distribution of the liquid to be filtered over said cavity.

9. A filter press comprising a plurality of frame members and plate members and means for clamping said members together with plates and frames alternating, a filtering medium between each two members, each of said members being formed from sheet metal and having a large central hole adapted to be covered by said filtering medium and four smaller holes, two communicating by a wide shallow passage in the thickness of the metal with the central hole at opposite points thereof and the other two unconnected therewith, said communicating holes in one member registering with said unconnected holes in adjacent members to form four conduits running the length of the assembly, two serving to admit unfiltered liquid to the frames and the other two to collect filtrate from the plates, and said central holes registering with one another to allow liquid to pass from each frame through the filtering medium to adjacent plates, two foraminous discs covering the central hole in each plate, said discs being adapted to support the filtering medium and means for spacing said discs apart, said means comprising a plurality of metal strips on edge, each strip having one edge attached to one of said discs and the other edge bearing on the other disc and the strips being so disposed in the cavity between the discs as to allow free passage of the filtrate through said cavity to the outlet, and a substantially cruciform member of substantially the same thickness as the frames disposed in the central cavity of each frame, said member serving to support the discs of adjacent plates in the event of out of balance pressure occurring, without preventing free distribution of the liquid to be filtered over said cavity.

EDWARD KINSELLA.
CHARLES WESLEY ADDY.